: (12) United States Patent
Wagner et al.

(10) Patent No.: US 8,266,189 B2
(45) Date of Patent: Sep. 11, 2012

(54) ADAPTING BETWEEN COUPLED AND DECOUPLED PROVIDER INTERFACES

(75) Inventors: Timothy A. Wagner, Seattle, WA (US); Zachary L. Anderson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 12/131,136

(22) Filed: Jun. 2, 2008

(65) Prior Publication Data

US 2009/0300646 A1    Dec. 3, 2009

(51) Int. Cl.
*G06F 17/30* (2006.01)
(52) U.S. Cl. .................................. 707/810; 719/312
(58) Field of Classification Search .................. None
See application file for complete search history.

(56) References Cited

U.S. PATENT DOCUMENTS

| 5,950,000 | A | 9/1999 | O'Leary et al. |
|---|---|---|---|
| 6,973,655 | B2 | 12/2005 | Jacquin et al. |
| 7,234,132 | B2 | 6/2007 | Lam |
| 7,257,818 | B2 | 8/2007 | Foerg et al. |
| 2003/0182651 | A1 | 9/2003 | Secrist et al. |
| 2004/0098703 | A1 | 5/2004 | Kondur |
| 2004/0139430 | A1 | 7/2004 | Eatough et al. |
| 2004/0177360 | A1* | 9/2004 | Beisiegel et al. ............ 719/316 |
| 2004/0181471 | A1 | 9/2004 | Rogers |
| 2005/0102558 | A1* | 5/2005 | Tiittanen et al. ............... 714/11 |
| 2005/0203892 | A1 | 9/2005 | Wesley et al. |
| 2005/0204048 | A1 | 9/2005 | Pujol et al. |
| 2005/0223392 | A1 | 10/2005 | Cox et al. |
| 2006/0020689 | A1 | 1/2006 | Roman et al. |
| 2007/0061782 | A1 | 3/2007 | Schreiner et al. |

OTHER PUBLICATIONS

"Integration Infrastructure Platform Solution Set" ISB Document Version 4.0, Sep. 14, 2006. 10 pages.
Mancoridis, "Loosely Integrating Tools Using the Star System", Proceedings of the 1994 conference of the Centre for Advanced Studies on Collaborative research. 8 Pages.
Hapke, et al., "Ophelia Open Platform for Distributed Software Development", Proceedings of Open Source International Conference, Malaga, Spain, 2004. 10 Pages.

* cited by examiner

*Primary Examiner* — Anteneh Girma

(57) ABSTRACT

Adapters are provided to convert a decoupled provider interface to a coupled provider interface and/or to convert a coupled provider interface to a decoupled provider interface. A decoupled provider may indirectly expose a data model by providing one or more of a sequence of unchanging views of data via snapshots and snapshot update events. A coupled provider may directly expose a dynamic data model or view and model update events. A decoupled consumer of data may consume data that is provided in snapshots and snapshot update events while a coupled consumer may consume data in the form of a dynamic data model and model update events.

15 Claims, 6 Drawing Sheets

ADAPTING BETWEEN COUPLED AND DECOUPLED PROVIDER INTERFACES

BACKGROUND

Whenever data is shared between suppliers of data and consumers of the supplied data, challenges may arise because the providers and the consumers do not provide and consume at the same rate. One challenge that may arise is consuming data that changes while it is being consumed. Ignoring the fact that the underlying data has changed could result in errors because incongruous or incoherent states of the data may have been consumed. Reacting to every change could force the consumer to do unnecessary or time-consuming computation, which may be incompatible with the responsiveness demands of the application. Locking the underlying data when a coherent data state is needed by the consumer could result in deadlock. Not locking the underlying data could require complex consumer code to handle the universe of changes that might occur or necessitate the production of expensive copies of the data.

SUMMARY

A decoupled provider may indirectly expose a data model by providing one or more of a sequence of static views of data via (a) snapshot(s). A snapshot may provide a coherent, immutable version of data at a particular point in time. A decoupled provider may also expose snapshot update events. A snapshot update event may include the previous snapshot, the updated snapshot and the delta, (the differences between the previous snapshot and the updated snapshot). A decoupled provider may expose its data model via a decoupled provider interface.

A coupled provider may directly expose a dynamic data model or view. The coupled provider may also expose model update events. A coupled provider may expose its data model via a coupled provider interface.

A decoupled consumer of data may consume data that is provided in snapshots and snapshot update events while a coupled consumer may consume data in the form of a dynamic data model and model update events.

Adapters may be provided to convert a decoupled provider interface to a coupled provider interface and/or to convert a coupled provider interface to a decoupled provider interface. That is, a decoupled consumer can receive data from a coupled provider via a decoupled provider interface using an adapter that converts a coupled provider interface to a decoupled provider interface. Similarly, a coupled consumer can receive data from a decoupled provider using an adapter that converts a decoupled provider interface to a coupled provider interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
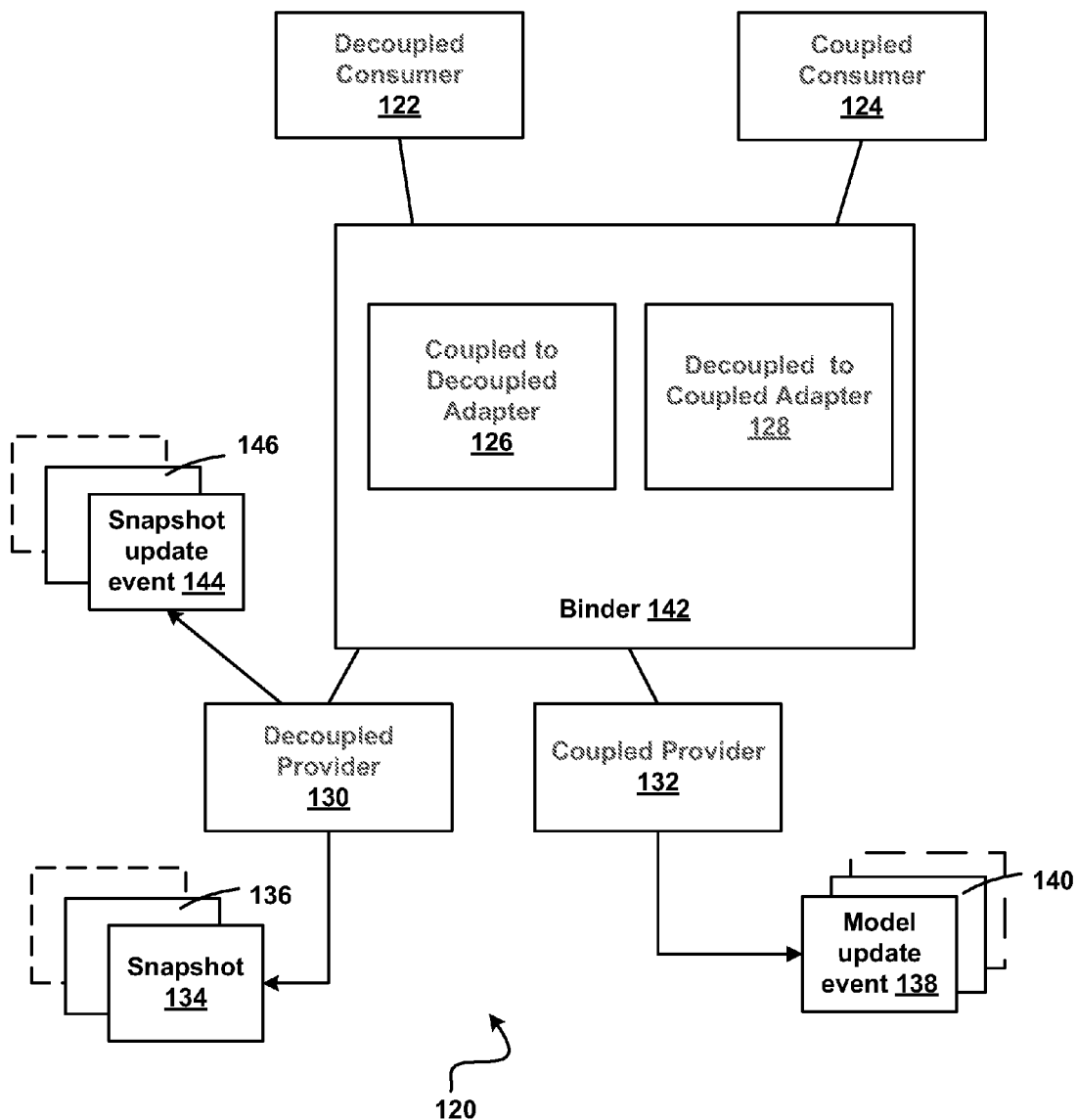
FIG. 1 is a block diagram of an example of a system that adapts between coupled and decoupled provider interfaces in accordance with aspects of the subject matter disclosed herein.

The technical challenges associated with bringing multiple suppliers or providers of data and consumers of the provided data together in a way that facilitates interactions lies not only in the production of the data but also in providing the ability to provide and consume the data in a performant way and to do so with participants (providers and consumers) that may choose to provide and consume data at different rates.

A decoupled consumer may want data to remain unchanged during a particular time frame or processing sequence because the work that the consumer is performing on the data takes a long time, because the consumer wants to assign processing tasks to sub-processes, or for other reasons. One way to provide data to a decoupled consumer is to provide static, unchangeable views of the data in the form of snapshots: immutable views of data where, although the data for which this snapshot is provided may change, the snapshot that exists does not change. A decoupled consumer may request to be notified of changes to the model via snapshot update events so that the consumer can choose a time at which to process the changes to the model. This type of consumer is referred to herein as a decoupled consumer because the consumer is decoupled from (not tightly coupled to) the provider in terms of how closely the consumer's view stays in sync with the provider's data.

Typically, the type of consumer that expects data to remain unchanged while the consumer is using it, is not a consumer that is associated with user interface processing. In contrast, a consumer associated with user interface processing is likely to be a coupled type of consumer. A browser, for example, may be an example of a coupled consumer. A browser typically wants its view of the data to be dynamic, so that, for example, if an item in a browser tree is expanded, it exposes the latest data.

This type of consumer is referred to herein as a coupled consumer because the consumer is tightly coupled to the provider in terms of how closely the consumer's view stays in sync with the provider's data. Such a consumer may request to be notified of every change to the data when it happens and may typically process those changes quickly to keep its view in sync with the provider's. It will be appreciated that although a consumer associated with user interface processing is likely to be a coupled consumer not all coupled consumer are associated with interface processing.

One way to provide data to both types of consumers is to have two providers, a (decoupled) provider that provides snapshot-style data and snapshot update events for a decoupled consumer and a second (coupled) provider that provides the data as a dynamic model with model update events for a coupled consumer. One provider could provide both data intended for a coupled consumer and data intended for a decoupled consumer, or adapters may be provided to convert a decoupled provider interface to a coupled provider interface and/or to convert a coupled provider interface to a decoupled provider interface.

To understand how the above described features may be useful, consider the example of a compiler. When a compiler is integrated into an IDE (integrated development environment), the data available to the compiler may be exposed to other subsystems. These subsystems may perform analysis on the exposed program elements, or may browse the exposed program elements and navigate to their locations in source code in an editor or may perform other tasks.

In this type of environment, a consumer of program element data such as a code analysis subsystem may be an example of a decoupled consumer. This kind of consumer may like to choose when it consumes change because code analysis takes a significant amount of time and because reacting to change requires particularly complex computation. Thus, a code analysis subsystem may ideally like to perform analysis on static data, that is, data that is unchanging. The alternative is to react to change that arrives in mid-analysis by either restarting the analysis or by selectively re-computing already computed results based on the observed changes.

Restarting wastes the system resources consumed to produce partial results, while correctly re-computing requires complex logic. The situation is exacerbated because of the length of time it takes to perform analysis. Extended analysis time increases the likelihood of potential change and increases the potential amount of change that may be detected during an analysis pass. As a decoupled consumer, an analysis subsystem may ignore change by working over an isolated, static version of data during an analysis pass, thereby avoiding the complexity of reactively re-computing results. If code analysis were computationally inexpensive, an alternative might be to perform synchronous processing, recalculating results on each change. Code analysis in reality is computationally expensive. Recalculating results on each change would result in an unacceptable user experience. For example, a user would have to wait for a lengthy analysis pass each time he or she entered a character in an editor if the data updating the display were consumed in a coupled fashion.

Alternatively, a consumer of program element data such as a code element browser may be an example of a coupled consumer. This kind of consumer may like to stay completely in sync with all underlying program element data changes because providing a synchronized browsing experience is neither computationally intensive for consuming data nor computationally intensive for reacting to changes. It is possible to provide a browsing experience which is essentially in sync with underlying data changes without significant complexity.

Different user features have different tolerances for the latency of change propagation. An analysis process may be quite tolerant of latency while a browsing or editing process may not be so tolerant.

In accordance with aspects of the subject matter disclosed herein, a binder is provided that provides access to adapters for decoupled and coupled consumers and providers. The binder may be extensible so that it can work with any data provider.

Adapting Between Coupled and Decoupled Provider Interfaces

FIG. 1 is a block diagram showing an example of a system 120 that supports data sharing between providers of data and consumers of data. The system may comprise a portion of an integrated design environment (IDE) such as the ones described and illustrated below with respect to FIG. 5, residing on one or more computers such as the computers described with respect to FIG. 6 also described below. Alternatively, system 120 may be provided as a stand-alone system or as a plug-in. Alternatively, system 120 may be unrelated to program code development and may be usefully employed wherever data is shared within a computational system.

System 120 may include one or more of the following: one or more decoupled providers such as decoupled provider 130, one or more coupled providers such as coupled provider 132, one or more decoupled consumers such as decoupled consumer 122, one or more coupled consumers such as coupled consumer 124, and one or more binders 142 which provide access to one or more adapters. Adapters accessible via binder 142 may include an adapter such as adapter 126 which adapts a coupled provider interface to a decoupled provider interface and adapter 128 which adapts a decoupled provider interface to a coupled provider interface. System 120 may also include shared data in the form of immutable snapshots 134, 136, etc. or snapshot update events 144, 146, etc., or model update events 138, 140, etc.

As described above, a coupled provider such as coupled provider 132, as the term is used herein, is a provider that provides data in the form of a dynamic model and model update events such as model update events 138, 140, etc. whereas a decoupled provider, such as decoupled provider 130, is a provider that provides data in the form of snapshots and snapshot update events such as snapshots 134, 136, etc. and snapshot update events 144, 146, etc. Similarly a coupled consumer, as used herein, is a consumer that consumes data in the form of a dynamic model and model update events whereas a decoupled consumer is a consumer that consumes data in the form of snapshots and snapshot update events.

As described above, a decoupled provider such as decoupled provider 130 may provide data in the form of one or more snapshots, such as snapshot 134, snapshot 136, etc. These snapshots may be provided by the provider and may be unchangeable so that whenever a consumer such as decoupled consumer 122 requests data from a snapshot, the same (unchanged and unchangeable) data is returned until the consumer requests a new snapshot or until a new snapshot is received and processed by the consumer. Snapshots can be shared among (decoupled or adapted) consumers.

A snapshot such as snapshot 134, snapshot 136, etc. may provide an immutable view of its provider's mutable state at a particular point in time. Each state access via a snapshot may be guaranteed to return the same results, regardless of changes to the provider's state. A snapshot may be the only place a consumer is able to obtain model state. A snapshot may be a copy of model state, a lazy snapshot state computation or may be the result of copy on write operations.

A snapshot update event such as snapshot update event 144, 146, etc. may include a previous snapshot, an updated snapshot and a delta, the differences between the previous snapshot and the updated snapshot, or pointers thereto. One model delta type may exist per model type. A snapshot update event may carry the delta.

A coupled provider such as coupled provider 132 may provide data in the form of a dynamic view of its state, and may provide model update data in the form of events (e.g., model update event 138, 140, etc.). When a coupled provider receives a request for data, it provides data which reflects all changes to date. Hence, a consumer that consumes data from a coupled provider has to keep its own copy of the data which it is processing, such as by storing the data in cache, if the consumer wants to use its view of data without requiring the provider to stop producing new data, copy the data, or otherwise support the consumer's need for ongoing, parallel access to the data.

Decoupled consumer 122 may consume shared data and may do so by consuming snapshots, immutable views of changeable data, each snapshot representing the state of the data at a particular point in time. Decoupled consumer 122, as described above, may expect data to remain unchanged during a particular time frame or processing sequence because of long analysis cycles or because decoupled consumer 122 hands off snapshots to sub-processes or for other reasons. Decoupled consumer 122 may request or may receive a new version of the data from time to time, such as, for example, when a new processing sequence is initiated, however, within a processing sequence, each time decoupled consumer 122 requests data from the snapshot, decoupled consumer 122 receives the same result. A consumer such as decoupled consumer 122 may register with a data provider to receive snapshot update events.

Coupled consumer 124 may consume shared data and may do so by receiving a dynamic model and may be notified when changes to the data occur. Coupled consumer 124 may be related to or may be tightly bound to user interface processing. Coupled consumer 124 may be notified of changes to the model via model update events, and may typically, although not exclusively, update quickly with small amounts of change data. Coupled consumer 124 may receive a current view of data and then may keep the data in sync with the provider's data via model update events. Coupled consumer 124 alternatively may only receive update data, building a data view from the updates or may employ some combination of the two. Coupled consumer 124 may track all changes as they occur and hand off changes to its sub-processes as events. Coupled consumer 124 may run on a single thread or handle its own thread synchronization.

Data can be shared among providers and consumers in several ways. A consumer such as decoupled consumer 122 may directly request a decoupled provider 130 for a snapshot or snapshot update events. A consumer such as coupled consumer 124 may directly request a coupled provider 132 for a dynamic model or model update events. A consumer such as decoupled consumer 122 may indirectly request a decoupled provider 130 by sending a request to the binder 142. In response the binder 142 may return a decoupled provider 130, which already supports the type of interface (i.e. a decoupled provider interface) desired by the requesting consumer. A consumer such as coupled consumer 124 may indirectly request the binder 142 for a coupled provider 132 by sending a request to the binder 142. In response the binder 142 may return the coupled provider 132 which already supports the type of interface (i.e., a coupled provider interface) desired by the requesting consumer.

A consumer such as decoupled consumer 122 may indirectly request a coupled provider 130 by sending a request to the binder 142. In response the binder 142 may determine that the type of provider interface exposed by the provider and the type of provider interface requested by the consumer are not the same (i.e., are different) and may return to the requesting consumer an adapter that converts the coupled provider interface exposed by the coupled provider to a decoupled provider interface. A consumer such as coupled consumer 124 may indirectly request a decoupled provider 130 by sending a request to the binder 142. In response the binder 142 may determine that the type of provider interface exposed by the provider and the type of provider interface requested by the consumer are not the same (i.e., are different) and may return to the requesting consumer an adapter that converts the decoupled provider interface exposed by the decoupled provider to a coupled provider interface. Hence requests to the binder 142 may return an object that supports the requested interface.

Alternatively, a consumer such as decoupled consumer 122 or coupled consumer 124 may provide a context and a desired interface type (coupled or decoupled) in a request to the binder 142, where the provided context is associated with or suggests a particular provider (whether coupled or decoupled). The binder may return the provider interface to the requesting consumer, if the provider already exists or may create the provider and return an interface to the created provider to the requesting consumer, if the provider does not already exist. If the provider exists but does not support the desired interface, the binder 142 may provide, or manufacture and provide, an adapter of the appropriate type, and provide the adapter to the consumer. If the provider does not exist and does not support the desired interface, the binder 142 may manufacture the provider, manufacture and provide an adapter of the appropriate type, and provide the adapter to the requesting consumer.

A binder such as binder 142 may create an adapter such as decoupled provider interface to coupled provider interface adapter 128 which translates a sequence of snapshots to the dynamic model and fine grained model update events for coupled consumers. The adapter may register with the underlying decoupled data provider to receive snapshot update events. The adapter may expose a dynamic data model by delegating to its current snapshot. That is, whenever the adapter is asked for data, the adapter may point to the latest snapshot that it has and treat that snapshot as its current snapshot. The adapter may pull a (new) current snapshot from the decoupled provider. The decoupled provider may push an updated snapshot to the adapter in a snapshot update event. Upon receiving a snapshot update event the adapter may update its current snapshot to which it delegates. This has the effect of making the data model the adapter exposes dynamic, as there is no guarantee that requests for the same data will yield the same result.

Upon receiving snapshot update events, the adapter may manufacture corresponding model update events using the snapshot update event's delta information. If there is no delta information available, the adapter 128 may perform a comparison between previous and updated snapshots to obtain the differences between them. The differences may then be used to expose model update events to the consumer. Thus, to the consumer, the adapter may appear to be a coupled provider.

A binder such as binder 142 may create an adapter such as coupled provider interface to decoupled provider interface adapter 126 which may manufacture snapshots using a cache that guarantees that any repeated request for data from a manufactured snapshot returns the same results. When changes occur at the provider, a new snapshot may be manufactured, which exposes a consistent view of data requested for the lifetime of the snapshot through the cache. For data which does not change between snapshots, the cached information may be shared between the snapshots. Fine-grained locking in combination with copy-on-read operations may be employed to store deltas in an offline or main memory database for later consolidation, etc. The snapshot generation technique described above with respect to providing a decoupled provider interface may be employed to implement a coupled to decoupled adapter at the cost of maintaining a copy of the original data.

An adapter that converts a coupled provider interface to a decoupled provider interface such as coupled provider interface to decoupled provider interface adapter 126 may expose snapshots and provide snapshot update events. The adapter may appear to the decoupled consumer to be a decoupled provider because the adapter provides the ability to read data from a current snapshot, to obtain a current snapshot and to register for snapshot update events. The data exposed by each snapshot exposed by the adapter may be exposed through a cache. When the snapshot is asked for data, the cache may be inspected. If the cache has the requested data, the requested data may be returned from the cache. If the cache does not have the requested data and the snapshot is still the most current snapshot (i.e., the underlying data at the provider has not changed), the adapter may go to the underlying coupled provider and get the requested data. If the snapshot is not the most current snapshot, only the data in the cache may be exposed, that is, the adapter does not go to the underlying data provider to get data.

The adapter may be aware of changes to the underlying provider because the adapter has registered with the coupled data provider for model update events. In response to a model update event received by the adapter, the adapter may inform any existing snapshot that it is no longer current. Thus, any subsequent request for data received by the snapshot may be returned from the cache.

In response to receiving a model update event, the adapter may create a new snapshot and provide a snapshot update event to the decoupled consumer. The new snapshot may expose data from its cache pulling from the underlying data provider as needed until such time as it is informed that it is no longer current. The snapshot is current until the next model update event is received at the adapter.

Figure 2:
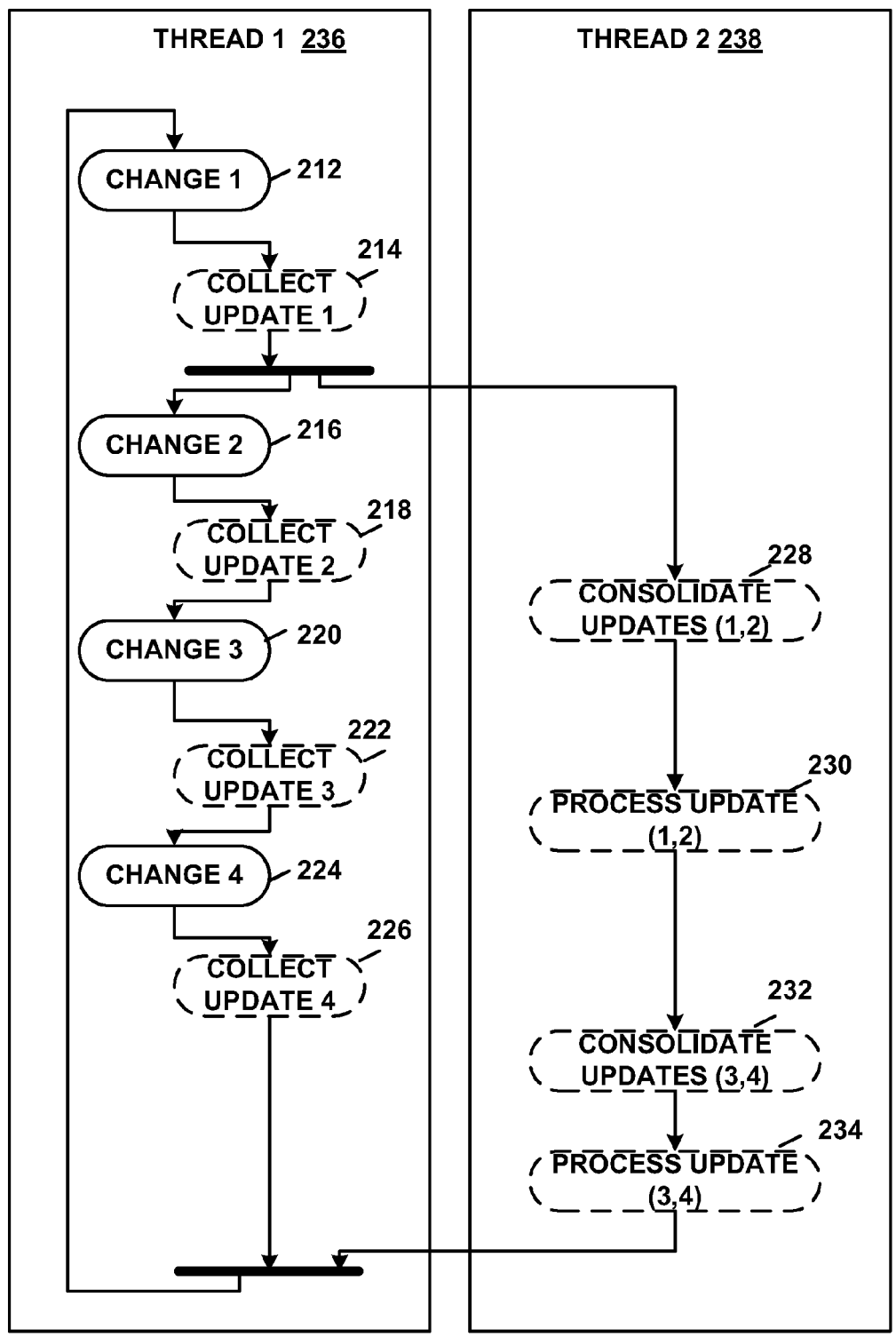
FIG. 2 is a concurrency diagram illustrating an example of consumption of snapshot updates in accordance with aspects of the subject matter disclosed herein.

FIG. 2 is a concurrency diagram illustrating an example of how a consumer such as decoupled consumer 124 may consume updates on a background thread in accordance with aspects of the subject matter disclosed herein. Processes performed by a provider are indicated by solid lines while processes performed by a consumer are indicated by hashed lines. In FIG. 2, time progresses in a forward direction from top to bottom. Thus, change one occurs temporally at the provider before change two occurs. Change three occurs at the provider and is received by the consumer before consolidated snapshot updates one and two are processed by the consumer in thread two. Multiple snapshots may be preserved in a decoupled provider, in a decoupled consumer, in a coupled-to-decoupled adapter, or elsewhere in the system.

In FIG. 2 thread one 236 represents a first thread on which changes occur and on which snapshot updates are collected by the consumer. Thread two 238 is a background thread on which collected snapshot updates may be consolidated and processed by the consumer. It will be understood that FIG. 2 illustrates one possible processing timeline and is meant to be illustrative rather than limiting. A consumer may be able to choose what snapshot update events to process and when to process them. A consumer may be able to request a provider to consolidate snapshot update events. A consumer may consume events on the same thread as the provider, on a separate thread, or from another agency altogether.

In FIG. 2, at 212 on thread one 236 a change is made at the provider. A consumer may receive a snapshot update event (which as described above may include a previous snapshot, an updated snapshot and a delta) notifying the consumer that a change has occurred to the data. The consumer may collect the snapshot update. At 214 the consumer collects the first snapshot update. At this point a second thread, thread two 238 may be initiated. At 216 another change may occur at the provider. At 218 the consumer may receive the second snapshot update. At 228 on thread two 238 the consumer may obtain a consolidated snapshot update for snapshot updates one and two from the provider or may itself consolidate snapshot updates one and two. At 220 on thread one 236 a third change is made at the provider. At 222 the third snapshot update is collected by the consumer. At 230 on thread two 238, the consolidated snapshot update for snapshot updates one and two are processed. It will be appreciated that although snapshot update three is available, the consumer in this example has decided to ignore the third snapshot update for the moment. At 224 on thread one 326 a fourth change is made at the provider and at 226 the fourth snapshot update is collected by the consumer. On thread two 238 at 232 the consolidated snapshot update for snapshot updates three and four are obtained by the consumer and at 234 the consolidated snapshot update is processed. Hence in FIG. 2 changes one through four are collected, consolidated and processed on a background thread, thread two 238.

In the example just described, the consumer has chosen at 230 to process only snapshot updates one and two, even though snapshot update three was available to it. Another consumer may have chosen to consolidate snapshot updates one, two and three and process all three consolidated snapshot update together. Another consumer may choose to consolidate snapshot updates one through four and process them all together. That is, the consumer on thread 2 can choose to process any number of updates and does not have to process all of the snapshot updates when they become available. Snapshot updates can be collected, and the consumer is able to choose when to process them. It will be apparent that the number of snapshot updates received, and the number of snapshot updates consolidated before processing, can vary between models and over time within the same model and is independent of the threading model, although for illustrative purposes two threads were shown here.

Figure 3:
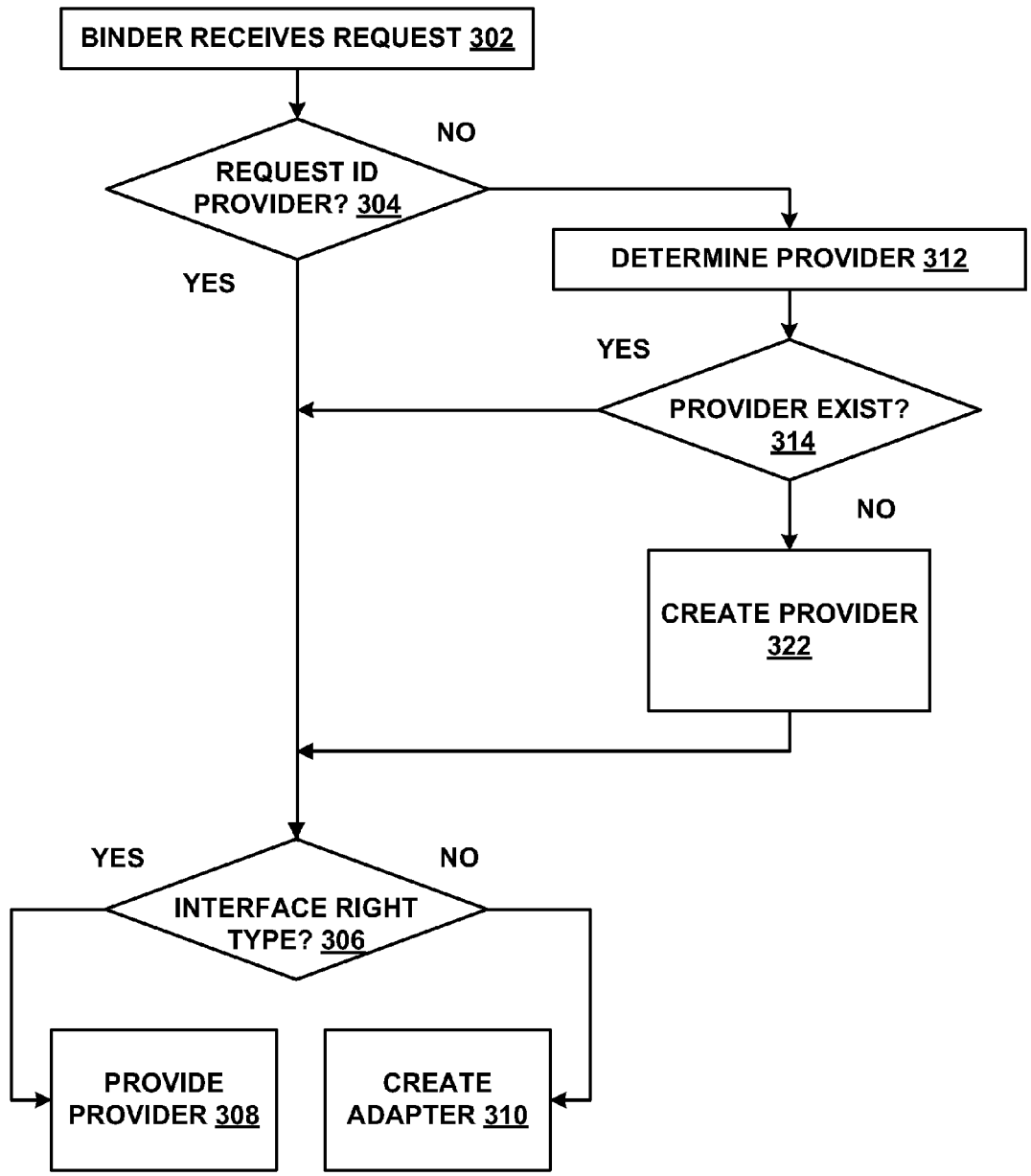
FIG. 3 is an example of a method for adapting between coupled and decoupled provider interfaces in accordance with aspects of the subject matter disclosed herein.

FIG. 3 illustrates an example of a method for adapting between coupled and decoupled provider interfaces in accordance with aspects of the subject matter disclosed herein. At 302 a binder may receive a request from a consumer. The request may identify the type of interface desired by the consumer. The request may explicitly identify the type of interface desired by the consumer or the binder may be able to determine the type of interface desired by the form or signature of the request or by the identity of the requester. A binder request may identify the desired interface and either the target provider or a context that implies a particular provider. At 304 the binder determines if the request identifies a particular provider or if the request identifies a context. If the request identifies a particular provider, at 306 the binder determines if the desired interface (decoupled or coupled) is exposed by the identified provider. If the identified provider exposes the interface requested by the consumer, the binder provides the identified provider to the requesting consumer at 308. If the identified provider does not expose the interface requested by the consumer, the binder may at 310 create or provide an adapter that converts the interface exposed by the provider to the requested interface and may provide the adapter to the consumer.

If, at 304 the binder determines that the request received from the consumer does not identify a particular provider but instead, identifies a context, at 312 the binder may use the provided context to determine an appropriate provider for the context. At 314 the binder may determine if the appropriate provider for the context exists. At 306, if the provider exists, the binder may determine if the provider exposes the requested interface. If the provider exposes the requested interface, at 308 the binder may provide the provider to the consumer. If the provider does not expose the requested interface, at 310, the binder may create or provide an adapter that converts the interface exposed by the provider to the requested interface and may provide the adapter to the consumer as the provider.

If, at 314 the binder determines that the appropriate provider for the context does not exist, at 322 the binder may create the requested provider. At 306 the binder may determine if the interface associated with the provider is of the requested type. If the interface to the provider is of the requested type, at 308 the binder may provide the provider to the consumer. If the interface to the provider is not of the requested type, at 310, the binder may create or provide an adapter that converts the interface to the provider to the requested type and may provide the adapter to the consumer.

Suppose for example, a binder at 302 receives a request from a decoupled consumer that identifies a provider and requests a decoupled provider interface. At 304 the binder determines that a particular requested provider is identified. At 306, suppose the binder determines that the requested provider exposes a decoupled provider interface. At 308, the binder may return the requested provider to the consumer. At 306, suppose instead the binder determines that the requested provider exposes a coupled provider interface. At 310, the binder may create or provide an adapter to convert the coupled provider interface of the coupled provider to a decoupled provider interface and return the adapter to the consumer.

Suppose at 302 the binder receives a request from a coupled consumer that identifies a context. At 312 the binder may determine an appropriate provider for the context. At 314, the binder may determine if the appropriate provider exists. If the provider does not exist, at 322 the binder may create the provider, and at 306 may determine that the created provider does not expose a coupled provider interface. At 310 the binder may create or provide an adapter that converts the coupled provider interface to a decoupled provider interface and provide the adapter to the consumer.

Figure 4A:
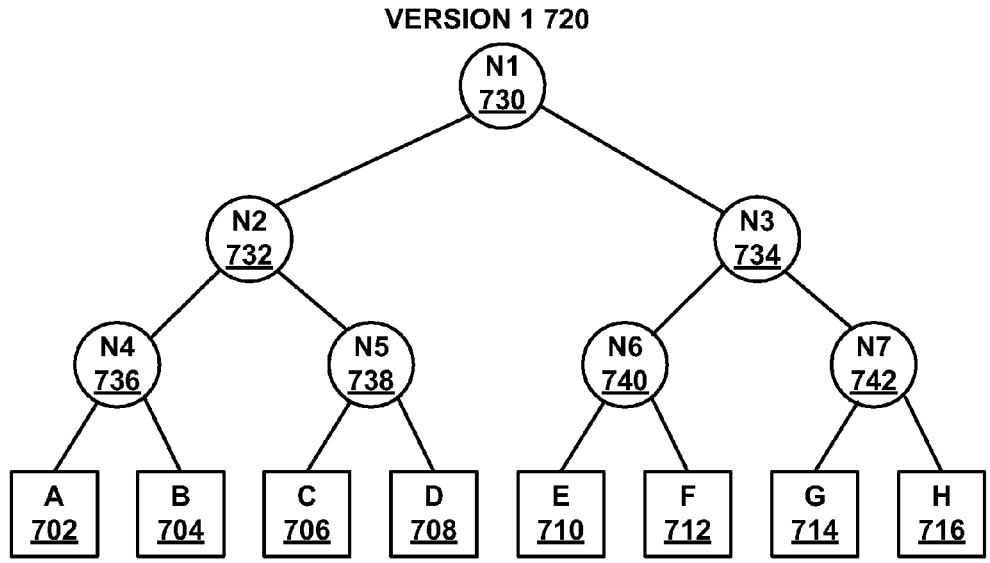
FIGS. 4a and 4b illustrate examples of versions of data structures supporting multiple versions of data in accordance with aspects of the subject matter disclosed herein.
Figure 4B:
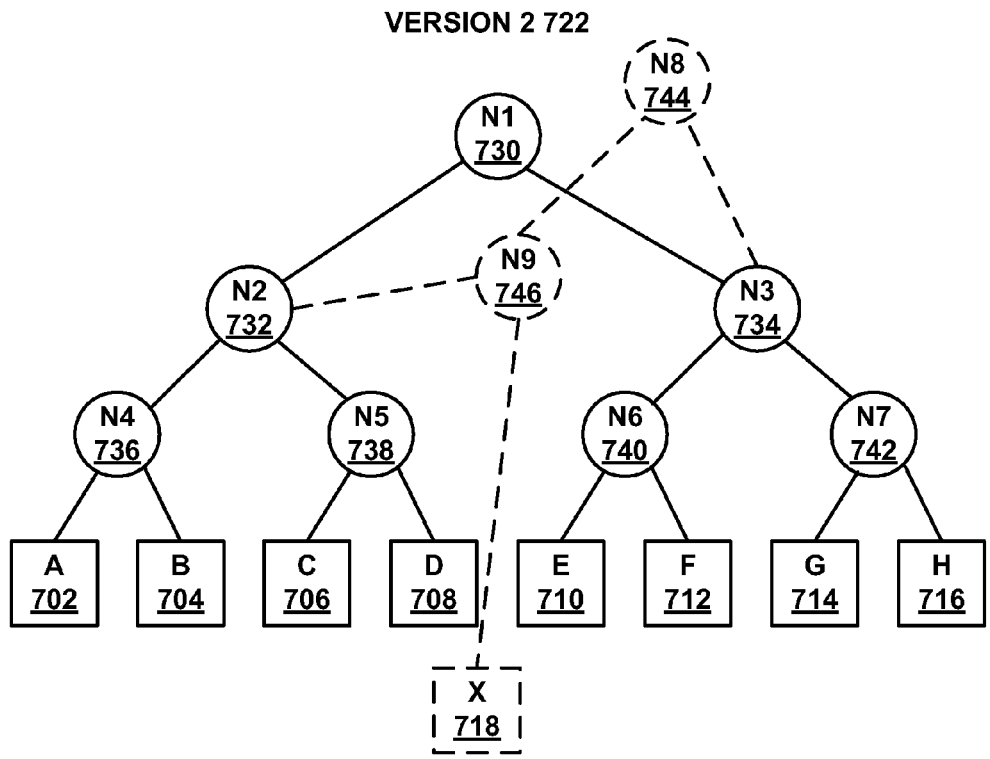

FIGS. 4a and 4b illustrate an example of two versions of data arranged in a data structure capable of supporting immutable snapshots and versioning in a performant fashion. It will be appreciated that while FIGS. 4a and 4b illustrate one particular mechanism by which a decoupled provider could produce snapshots in accordance with the practices discussed herein, multiple such mechanisms exist and that the particular representation of the snapshot and its deltas may take other forms. The data of the data structures of FIGS. 4a and 4b may represent versions of text in a text buffer, versions of tokens in a token stream or versions of any type of linear data. In FIGS. 4a and 4b this linear data is represented as a tree. Moreover, the tree generated may be a balanced binary tree. Version one 720 of the data structure comprises root node 1 730, node 2 732, node 3 734, node 4 736, node 5 738, node 6 740, and node 7 742, and leaf nodes A 702, B 704, C 706, D 708, E 710, F 712, G 714 and H 716. Root node 730 points to nodes node 2 732 and node 3 734, node 2 732 points to node 4 736 and node 5 738 and node 3 734 points to node 6 740 and node 7 742. Node 4 736 points to leaf nodes A 702 and B 704, node 5 738 points to leaf nodes C 706 and D 708, node 6 740 points to leaf nodes E 710 and F 712, and node 7 742 points to leaf nodes G 714 and H 716.

Suppose that the element "X" is inserted between elements "D" and "E". Insertion of element "X" may represent typing a character or characters into a text buffer, re-tokenizing a buffer, discovering an additional lexeme, or a change in state of any model. Suppose for purposes of illustration, version one 720 of the data represents the characters "ABCDEFGH" typed into a text buffer. Suppose further that insertion of element "X" represents typing the character "X" between the characters "D" and "E" in the text buffer. Version two 722 of the data is illustrated in FIG. 4b. That is, version two 722 represents the state of the data structure after "X" is inserted between characters "D" and "E.

In FIG. 4b a new root node has been created, root node 8 744. Root node 8 744 replaces root node 1 730 for version two of the data but version one exists unchanged. A model or client that accessed version one of the data before the insertion of the new leaf node can still access version one of the data by referencing root node 1 730 and sees no change to the data structure. A second model or client appearing after the model update can access version two 722 of the data structure by referencing root node 8 744. The version two root node, root node 8 744 points to a new node, node 9 746. Node 9 746 points to node 2 732 and to a new leaf node, leaf node X 718. The new portion of the tree (demarked in FIG. 4b by the hatched nodes and pointers) may represent a delta of the snapshot update event described above.

The tree structure of version two as illustrated in FIG. 4b may be rebalanced to maintain its initial performance characteristics. Furthermore the version two tree reuses the vast majority of the version one tree. The new data is efficiently represented by creating a new balanced binary tree with the new data stored at one or more new leaf nodes. A balanced binary tree as used herein can be created using any of several algorithms well known to those skilled in the art. The time estimated to access an element at the leaf node level is $O(\lg N)$ and the time and space to record a single edit is likewise $O(\lg N)$. It will be appreciated that in the example described above, a leaf node represented a single character. It will be appreciated that while the example was provided to aid understanding, in practice an approach balancing the precision of reference (the ability to isolate material in which an actor or client is interested) and the overhead of object allocation may be used.

When there are no remaining references to a node representing a snapshot, normal garbage collection may eliminate the unreferenced node. For example, referring again to FIG. 4b, suppose that the change made to the model state was undone or backed out (e.g., "X" was deleted from the text buffer so that the model state returned to that represented in version one 720). The delta: root node 8 744, node 9 746 and leaf node X 718 would be removed automatically, without a need for additional tracking or changes to normal garbage collection. All of these actions may occur transparently to a client viewing version one, even if the client views the model from a different thread.

Example of a Suitable Computing Environment

Figure 6:
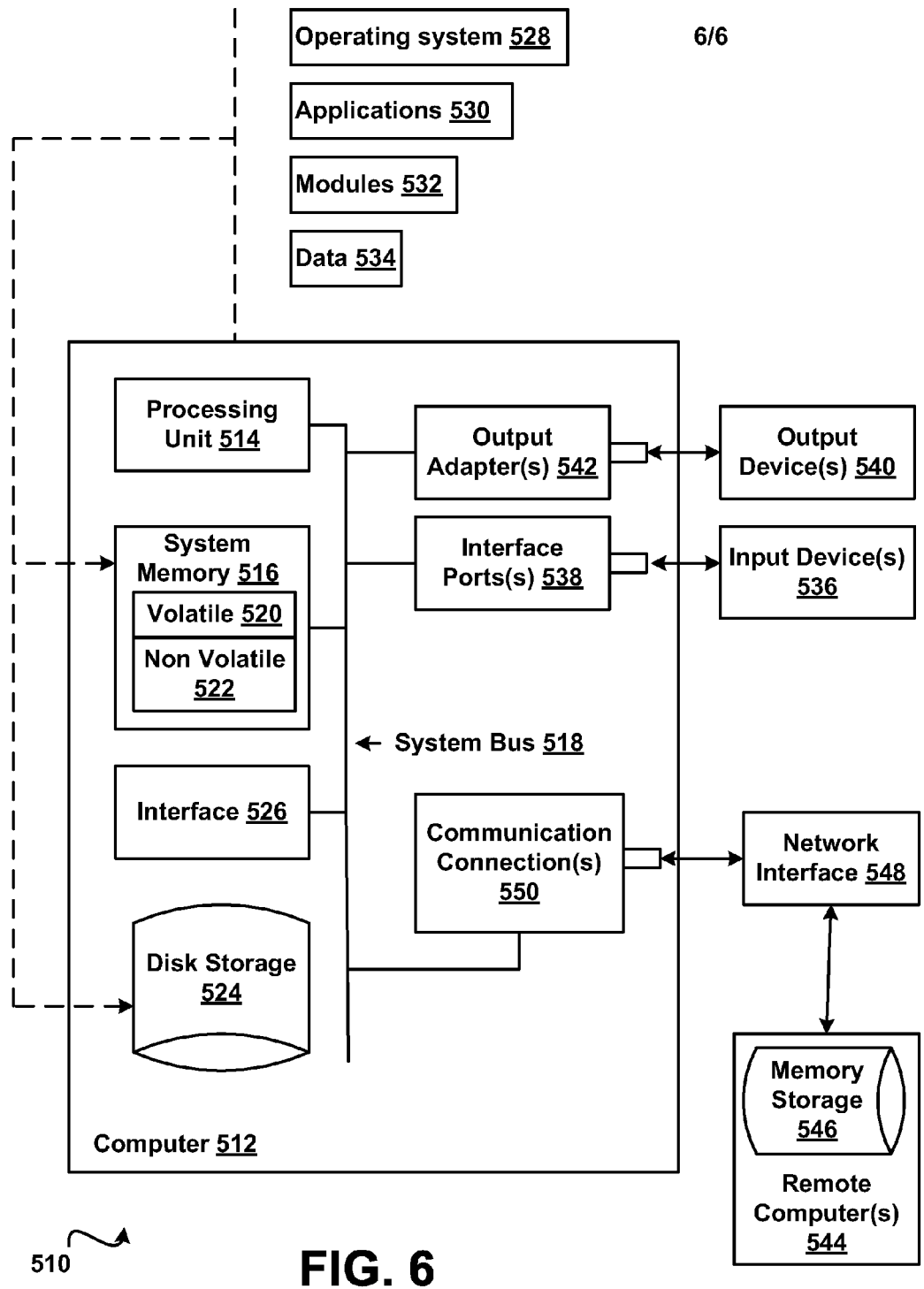
FIG. 6 is a block diagram illustrating an example of a computing environment in which aspects of the subject matter disclosed herein may be implemented.

In order to provide context for various aspects of the subject matter disclosed herein, FIG. 6 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, components, data structures, etc. that perform particular tasks or implement particular data types. Typically, the functionality of the program modules may be combined or distributed as desired in various embodiments. The operating environment 510 is only one example of a suitable operating environment and is not intended to limit the scope of use or functionality of the subject matter disclosed herein.

With reference to FIG. 6, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system components including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 6 describes software that can act as an intermediary between users and computer resources. This software may include an operating system 528 which can be stored on disk storage 524, and which can control and allocate resources of the computer system 512. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. It should be noted that other devices and/or systems or devices such as remote computer(s) 544 provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 6. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 5:
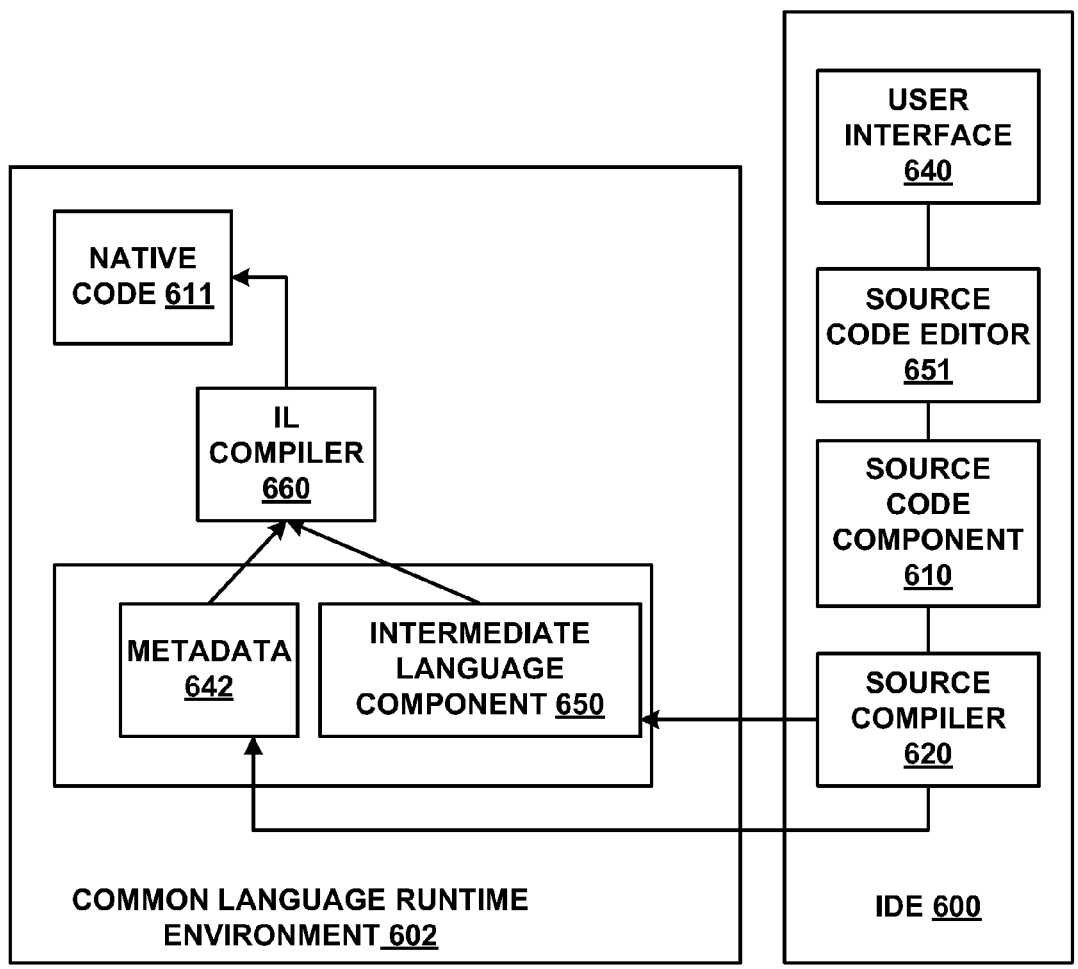
FIG. 5 is a block diagram of an example of an integrated design environment in accordance with aspects of the subject matter disclosed herein.

FIG. 5 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code environment that runs on a virtual machine. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system for adapting a provider interface comprising:
    a binder implemented by a processing unit that is coupled to a plurality of providers and a consumer, at least one of the plurality of providers having a provider interface of a first type, and at least another one of the plurality of providers having a provider interface of a second type,
    the consumer requesting a particular provider from the plurality of providers and a provider interface of a first type via a request, the request being configured to identify the particular provider and the provider interface of the first type, the binder being configured to receive the request,
    the binder further configured to:
        determine whether the particular provider exists,
        create the particular provider in response to determining that the particular provider does not exist,
        determine whether the particular provider exposes the provider interface of the first type or a second type in response to determining that the particular provider exists,
        provide the particular provider to the consumer in response to determining that the particular provider exposes the provider interface of the first type,
        in response to determining that the particular provider exposes the provider interface of the second type, create an adapter that converts the provider interface of the second type to the provider interface of the first type, and
    provide an object to the consumer, the object supporting the provider interface of the first type.

2. The system of claim 1, wherein the particular provider is a decoupled provider and indirectly exposes a data model by providing at least one unchanging view of data via a snapshot and at least one snapshot update event to the consumer.

3. The system of claim 2, wherein the at least one snapshot update event comprises a previous snapshot, an updated snapshot and a delta comprising a difference between the previous snapshot and the updated snapshot.

4. The system of claim 1, wherein the particular provider is a coupled provider and directly exposes a dynamic data model and provides model update events.

5. The system of claim 1, wherein the consumer is a coupled consumer and consumes a dynamic data model and model update events or wherein the consumer is a decoupled consumer and consumes snapshots and snapshot update events.

6. The system of claim 1, wherein the provider interface of the first type is a coupled provider interface and the provider interface of the second type is a decoupled provider interface and the adapter converts the decoupled provider interface to a coupled provider interface.

7. The system of claim 1, wherein the provider interface of the first type is a decoupled provider interface and the provider interface of the second type is a coupled provider interface and the adapter converts the coupled provider interface to a decoupled provider interface.

8. The system of claim 7, wherein the consumer is a decoupled consumer and the adapter converts the coupled provider interface to the decoupled provider interface by registering with the provider for model update events and in response to receiving a model update event, creates a snapshot that exposes data through a cache to the consumer, wherein requested data is returned from the cache and wherein in response to the adapter receiving a new model update event, the adapter creates a new snapshot and provides a snapshot update event to the consumer.

9. The system of claim 6, wherein the consumer is a coupled consumer and the adapter converts the decoupled provider interface to the coupled provider interface by registering with the provider to receive snapshot update events and pointing to a latest snapshot as a dynamic data model and translating a delta of a snapshot update event to a model update event and sending the model update event to the coupled consumer.

10. A method for adapting provider interfaces comprising:
    receiving a request from a consumer for data from a provider selected from a plurality of providers,
    wherein the request:
        identifies the provider or identifies a context associated with the provider and
        identifies a provider interface of a first type for the consumer, the provider interface of the first type comprising:
            a provider interface that indirectly exposes a data model using snapshots and provides snapshot update events or
            a provider interface that directly exposes a dynamic data model and provides model update events;
    determining whether the provider exists,
    creating the provider in response to determining that the particular provider does not exist,
    determining whether the provider exposes the provider interface of the first type or a second type in response to determining that the provider exists,
    providing the provider to the consumer in response to determining that the provider exposes the provider interface of the first type,
    in response to determining that the provider exposes the provider interface of the second type, creating an adapter that converts the provider interface of the second type to the provider interface of the first type, and
    providing an object to the consumer, the object supporting the provider interface of the first type.

11. The method of claim 10, further comprising: determining the provider associated with the context in the request.

12. The method of claim 10, wherein the object provided to the consumer is the adapter, and wherein the adapter:
   converts a coupled provider interface to a decoupled provider interface by registering with the provider for model update events and in response to receiving a model update event, creating a snapshot that exposes data through a cache to the consumer, wherein requested data is returned from the cache and wherein in response to receiving a new model update event, the adapter creates a new snapshot and provides a snapshot update event to the consumer or
   converts a decoupled provider interface to a coupled provider interface by registering with the provider to receive snapshot update events and pointing to a latest snapshot and translating a delta to a model update event and sending the model update event to the coupled consumer.

13. The method of claim 10, wherein the snapshot update events are consolidated and processed.

14. A computer-readable storage medium having computer program code recorded thereon for adapting provider interfaces, the computer program code comprising:
   a first program code configured to receive a request from a consumer that identifies a first type of provider interface for data from a provider, the provider exposing a second type of provider interface,
      wherein the first type of provider interface indirectly exposes a data model via snapshots and provides snapshot update events or directly exposes a dynamic data model and provides model update events, and
      wherein the second type of provider interface indirectly exposes a data model via snapshots and provides snapshot update events or directly exposes a dynamic data model and provides model update events;
   a second program code configured to determine whether the provider exists;
   a third program code configured to create the provider in response to determining that the particular provider does not exist;
   a fourth program code configured to determine whether the provider exposes the provider interface of the first type or a second type in response to determining that the provider exists;
   a fifth program code configured to provide the provider to the consumer in response to determining that the provider exposes the provider interface of the first type;
   a sixth program code configured to, in response to determining that the provider exposes the provider interface of the second type, create an adapter that converts the provider interface of the second type to the provider interface of the first type; and
   a seventh program code configured to provide an object to the consumer, the object supporting the first type of provider interface.

15. The computer-readable storage medium of claim 14, further comprising:
   an eighth program code configured to convert the second type of provider interface to the first type of provider interface by
   registering with the provider for model update events and in response to receiving a model update event,
   creating a snapshot that exposes data through a cache to the consumer, wherein requested data is returned from the cache,
   wherein in response to receiving a new model update event, creating a new snapshot and
   providing a snapshot update event to the consumer or
   convert the second type of provider interface to the first type of provider interface by registering with the provider to receive snapshot update events,
   pointing to a latest snapshot,
   translating a delta to a model update event and
   sending the model update event to the coupled consumer.

* * * * *